US009521925B2

(12) United States Patent
Gregory et al.

(10) Patent No.: US 9,521,925 B2
(45) Date of Patent: Dec. 20, 2016

(54) SLOW COOKER INCLUDING A REMOVABLE LID WITH DUAL LID PANELS

(75) Inventors: Christopher A. Gregory, St. Joseph, MI (US); Leif A. Norland, St. Joseph, MI (US); John A. Colasanti, Jenison, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1338 days.

(21) Appl. No.: 13/402,939

(22) Filed: Feb. 23, 2012

(65) Prior Publication Data

US 2012/0216684 A1    Aug. 30, 2012

Related U.S. Application Data

(60) Provisional application No. 61/446,517, filed on Feb. 25, 2011.

(51) Int. Cl.
   *A47J 27/00*    (2006.01)
   *A47J 36/06*    (2006.01)
   *A47J 43/28*    (2006.01)

(52) U.S. Cl.
   CPC .............. *A47J 36/06* (2013.01); *A47J 43/287* (2013.01)

(58) Field of Classification Search
   CPC ................... B65D 2251/1083; B65D 43/0225; B65D 43/0227; B65D 43/0229; B65D 43/0231; B65D 45/16; B65D 43/22; B65D 43/24; A47J 36/10; E05C 17/00; E05C 11/10
   USPC ....... 99/403, 348; 220/912, 573.1, 810, 831, 220/832, 826
   See application file for complete search history.

(56) References Cited

U.S. PATENT DOCUMENTS

| | | | |
|---|---|---|---|
| 1,210,813 A | | 1/1917 | Koopmann |
| 3,635,147 A | * | 1/1972 | Lee ................................. 99/348 |
| 5,636,732 A | * | 6/1997 | Gilels et al. ................... 206/37 |
| 7,658,142 B2 | | 2/2010 | Hoekstra et al. |
| 7,748,554 B2 | * | 7/2010 | Murphy ...................... 220/23.4 |
| 8,689,680 B2 | * | 4/2014 | Park ............................... 99/337 |
| 2004/0195238 A1 | | 10/2004 | Brija |
| 2008/0083730 A1 | | 4/2008 | Dolgov et al. |
| 2010/0140304 A1 | | 6/2010 | Walunis |
| 2010/0251902 A1 | * | 10/2010 | Schandel et al. .............. 99/348 |
| 2011/0017750 A1 | * | 1/2011 | Fortkamp ................. 220/573.1 |

FOREIGN PATENT DOCUMENTS

| | | |
|---|---|---|
| DE | 29820883 | 8/1999 |
| GB | 138991 | 2/1919 |
| WO | 0049924 | 8/2000 |

* cited by examiner

*Primary Examiner* — David Angwin
*Assistant Examiner* — Amit K Singh (57) ABSTRACT

A slow cooker includes a base having a heating element coupled thereto, a cooking vessel removably positioned in a compartment defined in the base, and a removable lid coupled to the cooking vessel. The cooking vessel has a cooking chamber defined therein. The removable lid includes a first panel that pivots between an open position in which access to the cooking chamber is permitted and a closed position in which access to the cooking chamber is prevented. The removable lid includes a second panel that also pivots between an open position in which access to the cooking chamber is permitted and a closed position in which access to the cooking chamber is prevented.

13 Claims, 8 Drawing Sheets

SLOW COOKER INCLUDING A REMOVABLE LID WITH DUAL LID PANELS

This patent application claims priority to and the benefit of U.S. Provisional Patent Application Ser. No. 61/446,517 entitled "Slow Cooker Lid" by Christopher A. Gregory et al., which was filed on Feb. 25, 2011, the entirety of which is expressly incorporated herein by reference.

CROSS-REFERENCE TO RELATED APPLICATIONS

Cross-reference is made to U.S. Design Pat. No. D644,476 entitled "Slow Cooker," which was filed on Feb. 25, 2011 by Christopher A. Gregory et al. and is incorporated herein by reference, and co-pending U.S. Design Pat. No. D645,302 entitled "Dual Lid," which was filed on Feb. 25, 2011 by Christopher A. Gregory et al. and is also incorporated herein by reference.

TECHNICAL FIELD

The present disclosure relates generally to a countertop appliance and more particularly to a slow cooker.

BACKGROUND

A slow cooker is a domestic appliance used to cook food items in a home. A slow cooker typically includes an outer shell or base and a cooking vessel or crock into which a user may place food items to be cooked. The base includes one or more electric heating elements configured to generate heat, which is transferred from the base to the cooking vessel to cook the food items.

A slow cooker also includes a lid that is positioned on the cooking vessel to cover the food items. In many slow cookers, condensation may build up on the lid as a result of the cooking activity inside the cooking vessel. When the lid is removed, the condensation may run out onto a countertop, table, or floor. Users may hold the lid upside down in one hand while holding a serving utensil with the other hand to serve from the slow cooker.

SUMMARY

According to one aspect of the disclosure, a slow cooker is disclosed. The slow cooker includes a base having a heating element coupled thereto, a cooking vessel removably positioned in a compartment defined in the base, and a removable lid coupled to the cooking vessel. The cooking vessel has a cooking chamber defined therein. The removable lid includes a first panel that is moveable between an open position in which access to the cooking chamber is permitted and a closed position in which access to the cooking chamber is prevented. The removable lid also includes a second panel that is moveable between an open position in which access to the cooking chamber is permitted and a closed position in which access to the cooking chamber is prevented.

In some embodiments, the removable lid further may include a frame, and the first panel and the second panel may be pivotally coupled to the frame. In some embodiments, the frame may include an outer rim engaged with the cooking vessel. The outer rim may define an outer perimeter of the frame. The frame may also include a first inner flange that defines a first opening in the frame and a second inner flange that defines a second opening in the frame. The first panel may be positioned within the outer perimeter of the frame and may be configured to engage the first inner flange and enclose the first opening when the first panel is in the closed position. The second panel may be positioned within the outer perimeter of the frame and may be configured to engage the second inner flange and enclose the second opening when the second panel is in the closed position.

In some embodiments, the first panel may include an outer gasket configured to engage the first inner flange. The second panel may include an outer gasket configured to engage the second inner flange.

Additionally, in some embodiments, the frame may include a handle positioned between the first opening and the second opening. In some embodiments, the handle may include a support base and a grip positioned above the support base. The first panel and the second panel may be pivotally coupled to the support base of the handle.

In some embodiments, the removable lid may include a retention mechanism configured to maintain the first panel in the open position. In some embodiments, the retention mechanism may include a clip secured to the first panel. The clip may be configured to engage the grip of the handle when the first panel is in the open position. Additionally, in some embodiments, the slow cooker may further include a cooking utensil having a handle arm. The clip may be sized to receive the handle arm when the first panel is in the closed position.

In some embodiments, the removable lid may further include a locking mechanism configured to lock the first panel in the closed position. In some embodiments, the first panel may have an upper surface and a lower surface. The locking mechanism may include a handle pivotally coupled to the first panel, the handle having a grip positioned above the upper surface of the first panel, and an arm secured to an end of the handle below the lower surface of the first panel. The arm may be movable between a locked position in which a tip of the arm is engaged with the frame, and an unlocked position in which the tip of the arm is disengaged from the frame.

In some embodiments, the removable lid may include a biasing element configured to bias the first panel in the open position. Additionally, in some embodiments, each of the first panel and the second panel may include a glass plate.

In some embodiments, the cooking vessel may include a rim that defines the cooking chamber. The first panel may further include an outer shell secured to the glass plate and configured to engage the rim of the cooking vessel.

According to another aspect, a slow cooker includes a base having a heating element coupled thereto, a cooking vessel removably positioned in a compartment defined in the base, and a removable lid coupled to the cooking vessel. The cooking vessel has a cooking chamber defined therein. The removable lid has a handle including a grip that defines a longitudinal axis, a first panel coupled to the handle, and a second panel coupled to the handle. The first panel is configured to pivot about the longitudinal axis between an open position in which access to the cooking chamber is permitted and a closed position in which access to the cooking chamber is prevented.

In some embodiments, the cooking vessel may include a rim that defines the cooking chamber. The first panel may include a glass plate and an outer shell secured to the glass plate. The outer shell may be configured to engage the rim of the cooking vessel.

In some embodiments, the removable lid may further include a support arm having a first end secured to the outer shell of the first panel and a second end pivotally coupled to the grip of the handle.

In some embodiments, the second panel may be configured to pivot about the longitudinal axis from an open position in which access to the cooking chamber is permitted and a closed position in which access to the cooking chamber is prevented.

According to another aspect, a slow cooker includes a base having a heating element coupled thereto, a cooking vessel removably positioned in a compartment defined in the base, and a removable lid coupled to the cooking vessel. The cooking vessel has a cooking chamber defined therein. The removable lid includes a handle, a first panel pivotally coupled to the handle and moveable between an open position in which access to the cooking chamber is permitted and a closed position in which access to the cooking chamber is prevented, and a second panel pivotally coupled to the handle and moveable between an open position in which access to the cooking chamber is permitted and a closed position in which access to the cooking chamber is prevented. In some embodiments, the removable lid further includes an outer shell, and the handle is pivotally coupled to the outer shell.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring now to FIGS. 1-4, a countertop appliance is shown as a slow cooker 10. The slow cooker 10 includes a cooker assembly 12 and a removable lid 14 configured to be attached to the cooker assembly 12. The cooker assembly 12 includes an outer shell or base 16 and a cooking vessel 18 positioned in the base 16. As described in greater detail below, a cooking chamber 20 is defined in the vessel 18, and the cooking chamber 20 is sized to receive food items to be cooked by the slow cooker 10.

Figure 1:
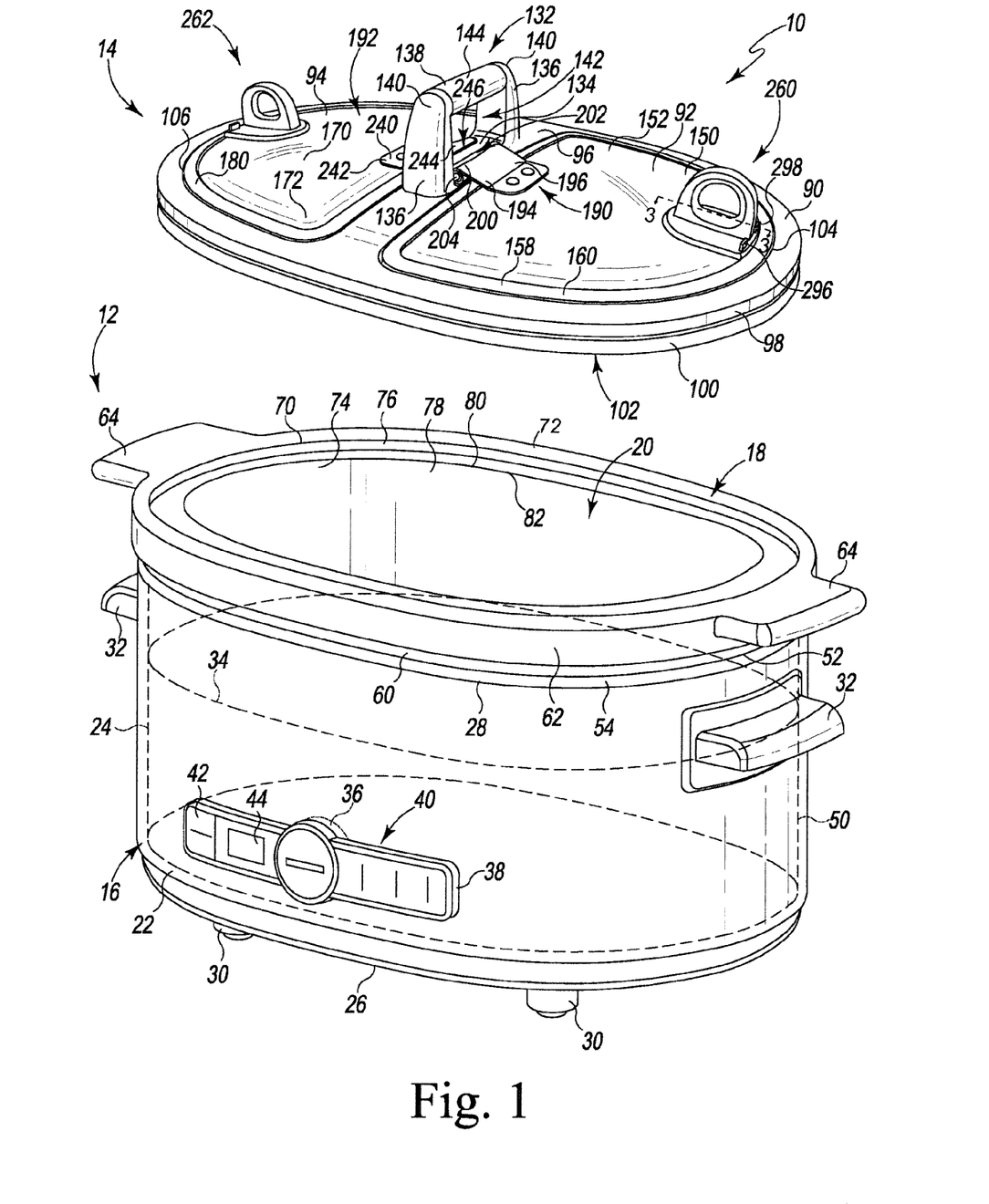
FIG. 1 is an exploded perspective view of a removable lid and a cooker assembly of a slow cooker.

The base 16 of the slow cooker 10 has a housing 22 that supports the cooking vessel 18. The housing 22 includes an outer side wall 24 that extends from a bottom end 26 to a top end 28. A number of mounting feet 30 extend downwardly from the bottom end 26 of the housing 22. Each foot 30 is positioned in a corner of the housing 22 and is configured to contact a counter or table surface. A pair of handles 32 extends outwardly from opposite sides of the side wall 24 adjacent to the top end 28 of the housing 22. The handles 32 are sized such that a user may grasp the handles 32 to lift and carry the slow cooker 10.

The base 16 of the cooker 10 includes a heating element 34 secured to the housing 22. In the illustrative embodiment, the heating element 34 includes a plurality of low-wattage electric coils integrated into the housing 22. An electric cord (not shown) is attached to the base 16 and is configured to connect the cooker 10 to an external power supply. The cooker 10 also includes an electronic controller 36, which is electrically coupled to the heating element 34. The electronic controller 36 is configured to regulate the supply of electric power to the heating element 34.

As shown in FIG. 1, a control panel 38 is attached to the side wall 24 of the housing 22. The panel 38 includes a number of controls 40 that are electrically connected to the controller 36. The controls 40 include a number of buttons 42 and a display 44, which may be used to control the operation of the controller 36 and hence the heating element 34. It should be appreciated that in other embodiments the control panel 38 may include any combination of buttons, switches, or other structure necessary to control the operation of the slow cooker 10.

The side wall 24 of the housing 22 defines an inner compartment 50 sized to receive the cooking vessel 18 of the slow cooker 10. As shown in FIG. 1, the inner compartment 50 has an upper opening 52 defined by a rim 54. In the illustrative embodiment, the rim 54 defines an oblong-shaped opening 52. It should be appreciated that in other embodiments the opening 52 may be circular or another geometric shape.

As described above, the cooker assembly 12 also includes a crock or cooking vessel 18 that is removable from the base 16. The cooking vessel 18 has a ceramic body 60, which is received in the inner compartment 50 of the housing 22 when the vessel 18 is installed on the base 16. As shown in FIG. 1, the body 60 has an upper flange 62, and the cooking vessel 18 includes a pair of handles 64 that extend outwardly from opposite sides of the flange 62. The handles 64 are sized such that a user may grasp the handles 64 to install the vessel 18 on the base 16 or remove the vessel 18 from the base 16 for cleaning, storage, and so forth.

The body 60 of the cooking vessel 18 includes an opening 70 that is defined in an upper surface 72. As shown in FIG. 1, an inner wall 74 extends downwardly from the opening 70. The inner wall 74 includes an upper wall 76 and a lower wall 78 offset or otherwise spaced inwardly from the upper wall 76. The walls 76, 78 cooperate to define a rim 80 therebetween, and the lower wall 78 cooperates with a bottom wall (not shown) to define the cooking chamber 20 in the vessel 18. The cooking chamber 20 has an upper opening 82 that is defined by the rim 80. In the illustrative embodiment, the rim 80 defines an oblong-shaped opening 82. It should be appreciated that in other embodiments the opening 82 may be circular or another geometric shape. As will be described in greater detail below, the removable lid 14 of the slow cooker 10 is configured to engage the rim 80 of the body 60 to enclose the upper opening 82 and hence the cooking chamber 20.

As shown in FIG. 1, the removable lid 14 of the slow cooker 10 includes a frame 90 and a pair of lid panels 92, 94 pivotally coupled to the frame 90. The frame 90 includes an upper wall 96 and an outer wall 98 that extends downwardly from the upper wall 96 to define the outer perimeter of the frame 90. In the illustrative embodiment, the frame 90 is formed from a metallic material such as, for example, steel. In other embodiments, the frame may be formed from, for example, a rigid plastic or glass.

A gasket 100 is attached to the perimeter wall 98, and the lower end 102 of the gasket 100 is configured to engage the rim 80 of the cooking vessel 18 to substantially seal the cooking chamber 20. In that way, the removable lid 14 prevents moisture from escaping the cooking chamber 20 during cooking. In the illustrative embodiment, the gasket 100 is formed from semi-flexible rubber and may be detached from the frame 90 for cleaning. In other embodiments, the gasket may be formed from a rigid or semi-rigid polymeric material. It should be appreciated that in other embodiments the gasket may be omitted, and the frame 90 may be configured to directly engage the rim 80 of the cooking vessel 18.

Figure 2:
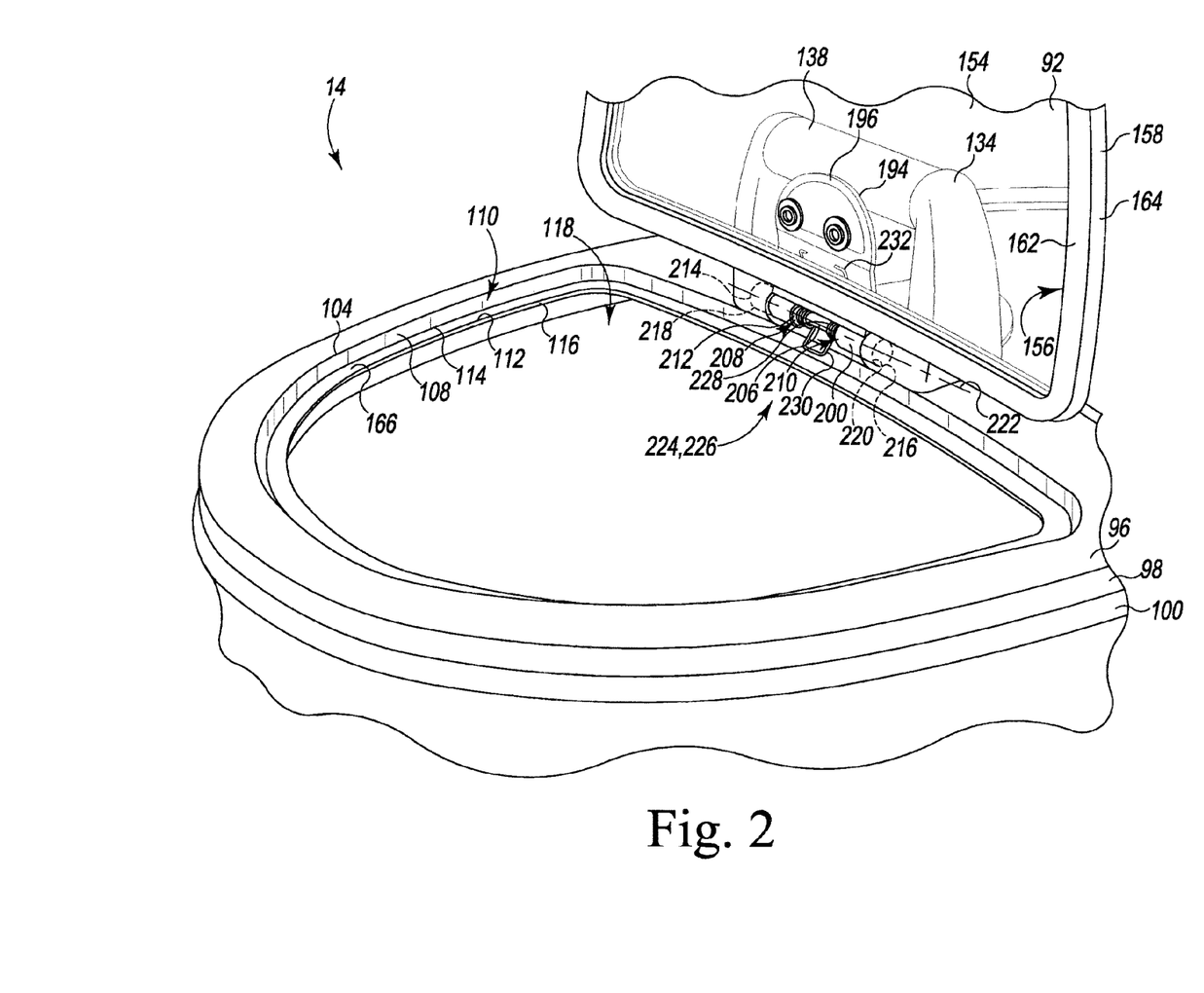
FIG. 2 is a perspective view of the removable lid of FIG. 1 with a lid panel open.

The upper wall 96 of the frame 90 has a pair of openings 104, 106 defined therein. As shown in FIG. 2, an inner wall 108 extends downwardly from the opening 104 to define a recess 110 in the frame 90. The frame 90 also includes a flange 112 that extends inwardly from the lower end 114 of the inner wall 108 to an edge 116. The edge 116 defines an inner opening 118 in the frame 90. As will be described in greater detail below, the user may reach through the inner opening 118 of the frame 90 to access the contents of the cooking vessel 18 when the removable lid 14 is attached to the cooker assembly 12.

Figure 4:
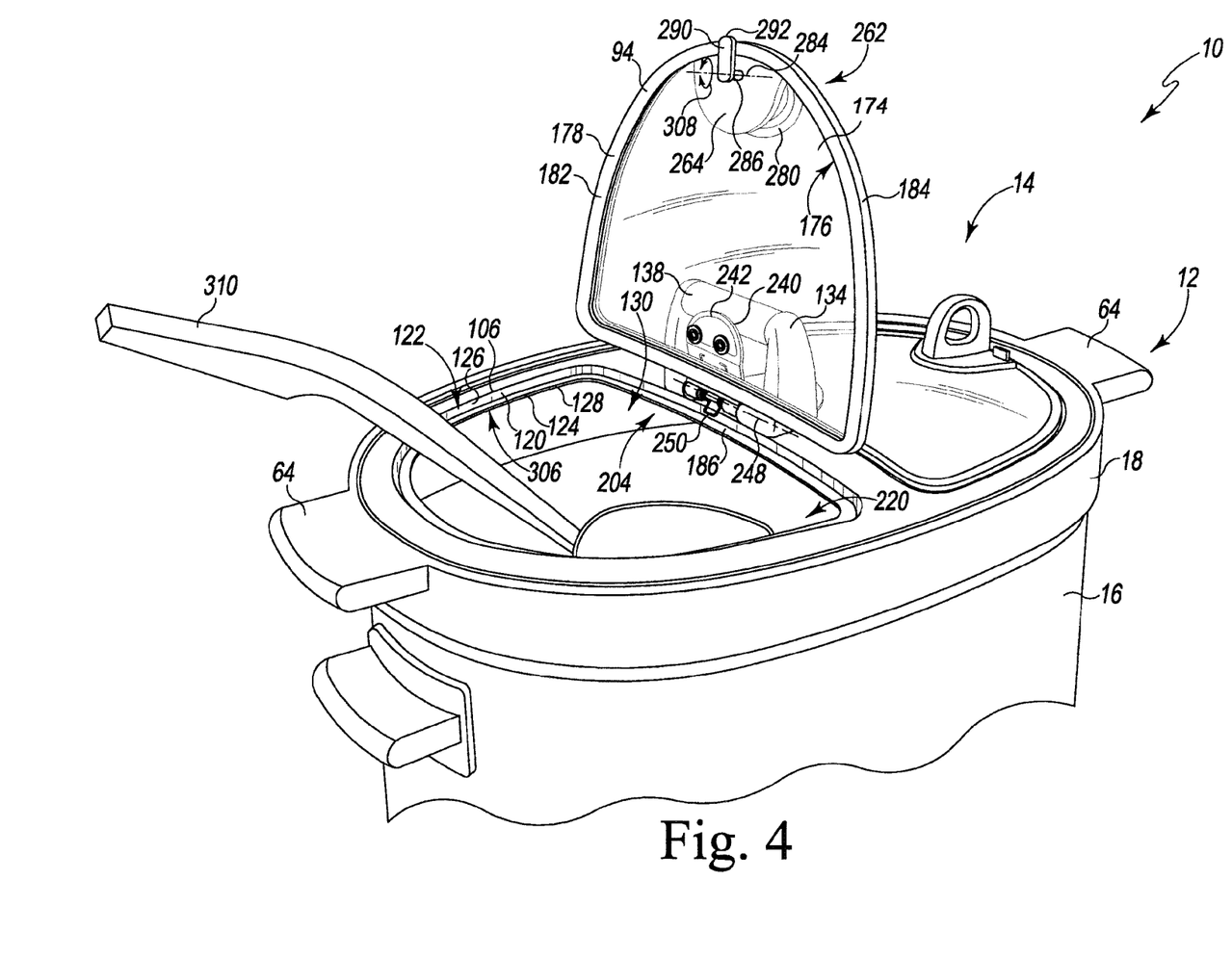
FIG. 4 is a perspective view of the slow cooker of FIG. 1 showing another lid panel open.

As shown in FIG. 4, the frame 90 of the removable lid 14 has another inner wall 120 that extends downwardly from the other opening 106 to define another recess 122 in the frame 90. A flange 124 extends inwardly from the lower end 126 of the inner wall 120 to an edge 128. The edge 128 defines an inner opening 130 in the frame 90. Similar to the other inner opening 118, the user may reach through the inner opening 130 of the frame 90 to access the contents of the cooking vessel 18 when the removable lid 14 is attached to the cooker assembly 12.

Returning to FIG. 1, the removable lid 14 of the slow cooker 10 includes a handle 132 that is positioned between the openings 104, 106. The handle 132 has a support base 134 that is secured to the upper wall 96 of the frame 90 and a pair of arms 136 that extend upwardly from the support base 134. A grip 138 extends between the upper ends 140 of the arms 136 such that a substantially rectangular slot 142 is defined in the handle 132. As shown in FIG. 1, the grip 138 has a substantially-smooth cylindrical outer surface 144. In the illustrative embodiment, the grip 138 is formed from a metallic material, and the support base 134 and arms 136 are formed from a polymeric material. It should be appreciated that in other embodiments the grip 138 may include molded slots or recesses sized to receive fingers of a user. It should be appreciated that in other embodiments the handle 132 may be omitted from the removable lid.

As described above, the removable lid 14 of the cooker 10 also includes a pair of lid panels 92, 94 pivotally coupled to the frame 90. Each of the lid panels 92, 94 is configured to be independently moved from the closed positions shown in FIG. 1 to the open positions shown in FIGS. 2 and 4. As shown in FIG. 1, the lid panel 92 includes a plate 150 shaped and sized to be received in the recess 110 defined in the frame 90. The plate 150 of the lid panel 92 includes a convex upper surface 152, a concave lower surface 154, and a side wall 156 extending between the surfaces 152, 154. It should be appreciated that in other embodiments the surfaces 152, 154 may be substantially planar.

The lid panel 92 of the removable lid 14 also includes a gasket 158 that engages the plate 150. As shown in FIG. 1, the gasket 158 includes an upper section 160 that extends over the upper surface 152 of the plate 150. The gasket 158 has a corresponding lower section 162 (see FIG. 2) that extends over the lower surface 154 of the plate 150 and a section 164 that connects the lower section 162 to the upper section 160. When the lid panel 92 is in the closed position shown in FIG. 1, the lower section 162 of the gasket 158 engages the upper surface 166 of the flange 112 of the frame 90, thereby enclosing the inner opening 118 of the frame 90.

Similarly, the other lid panel 94 includes a plate 170 that is shaped and sized to be received in the recess 122 defined in the frame 90. The plate 170 of the lid panel 94 includes a convex upper surface 172, a concave lower surface 174, and a side wall 176 extending between the surfaces 172, 174. The lid panel 94 of the removable lid 14 also includes a gasket 178 that engages the plate 170. As shown in FIG. 1, the gasket 178 includes an upper section 180 that extends over the upper surface 172 of the plate 170. The gasket 178 has a corresponding lower section 182 (see FIG. 4) that extends over the lower surface 174 of the plate 170 and a section 184 that connects the lower section 182 to the upper section 180. When the lid panel 94 is in the closed position shown in FIG. 1, the lower section 182 of the gasket 178 engages the upper surface 186 of the flange 124 of the frame 90, thereby enclosing the inner opening 130 of the frame 90.

In the illustrative embodiment, the plates 150, 170 of the lid panels 92, 94 are approximately the same size. In other embodiments, one of the plates 150, 170 may be larger than the other. Additionally, as shown in FIGS. 1-4, the plates 150, 170 of the lid panels 92, 94 are formed from glass and are substantially transparent. It should be appreciated that in other embodiments the glass may be tinted or opaque, and, in other embodiments, one or both of the plates 150, 170 may be formed from a metallic material such as aluminum or steel. The gaskets 158, 178 of the lid panel 92 are formed from semi-flexible rubber and may be detached from the plates 150, 170 for cleaning. In other embodiments, one or both of the gaskets may be formed from a rigid or semi-rigid polymeric material. It should also be appreciated that in other embodiments the gaskets may be omitted from lid panels.

The lid panels 92, 94 of the slow cooker 10 are pivotally coupled to the frame 90 via a pair of hinge assemblies 190, 192. The hinge assembly 190 includes a bracket 194 that has a body 196 secured to the plate 150 of the lid panel 92. The body 196 of the bracket 194 has an end 200 that projects outwardly from the plate 150 and is received in a slot 202 defined in the support base 134 of the handle 132. As shown in FIG. 2, the bracket 194 is coupled to the support base 134 via a pivot joint 204.

The pivot joint 204 of the hinge assembly 190 includes a cylindrical pin 206 that extends through a pair of bores 208, 210 defined in the end 200 of the bracket 194. A bushing 212 is positioned in each of the bores 208, 210 between the bracket 194 and the pin 206. In the illustrative embodiment, each bushing 212 is formed from a polymeric material. As shown in FIG. 2, the ends 214, 216 of the pin 206 are received in a pair of apertures 218, 220 defined in the support base 134. The pin 206 defines a longitudinal axis 222 about which the lid panel 92 pivots when the lid panel 92 is moved between the closed position shown in FIG. 1 and the open position shown in FIG. 2.

The hinge assembly 190 also includes a biasing element 224 configured to bias the lid panel 92 in the open position. As shown in FIG. 2, the biasing element 224 is a helical torsion spring 226 having a number of coils 228 wrapped around the pin 206. The spring 226 includes a first end 230 that engages the upper wall 96 of the frame 90 and a second end 232 that engages the body 196 of the bracket 194. It should also be appreciated that in other embodiments the biasing element may be omitted.

As shown in FIG. 1, the hinge assembly 192 coupling the other lid panel 94 to the frame 90 includes a bracket 240 that has a body 242 secured to the plate 170 of the lid panel 94. The body 242 of the bracket 240 has an end 244 that projects outwardly from the plate 170 and is received in a slot 246 defined in the support base 134 of the handle 132. Like the bracket 194 of the hinge assembly 190, the bracket 240 is coupled to the support base 134 via another pivot joint 204. As shown in FIG. 4, the pivot joint 204 of the hinge assembly 192 defines a longitudinal axis 248 about which the lid panel 94 pivots as the lid panel 94 is moved between the closed position (see FIG. 1) and the open position (see FIG. 4). The hinge assembly 192 also includes a biasing element 250 configured to bias the lid panel 94 in the open position.

In the illustrative embodiment, the hinge assemblies 190, 192 are attached to the support base 134 of the handle 132. It should be appreciated that in other embodiments one or both of the hinge assemblies 190, 192 may be attached to another structure on the frame. For example, the frame may include a plate or bracket that extends upwardly from the upper wall of the frame, and one or both of the hinge assemblies may be attached to the plate or bracket instead of the handle 132. Additionally, in other embodiments, the removable lid may include additional hinge assemblies to pivotally couple the lid panels to the frame.

Figure 3:
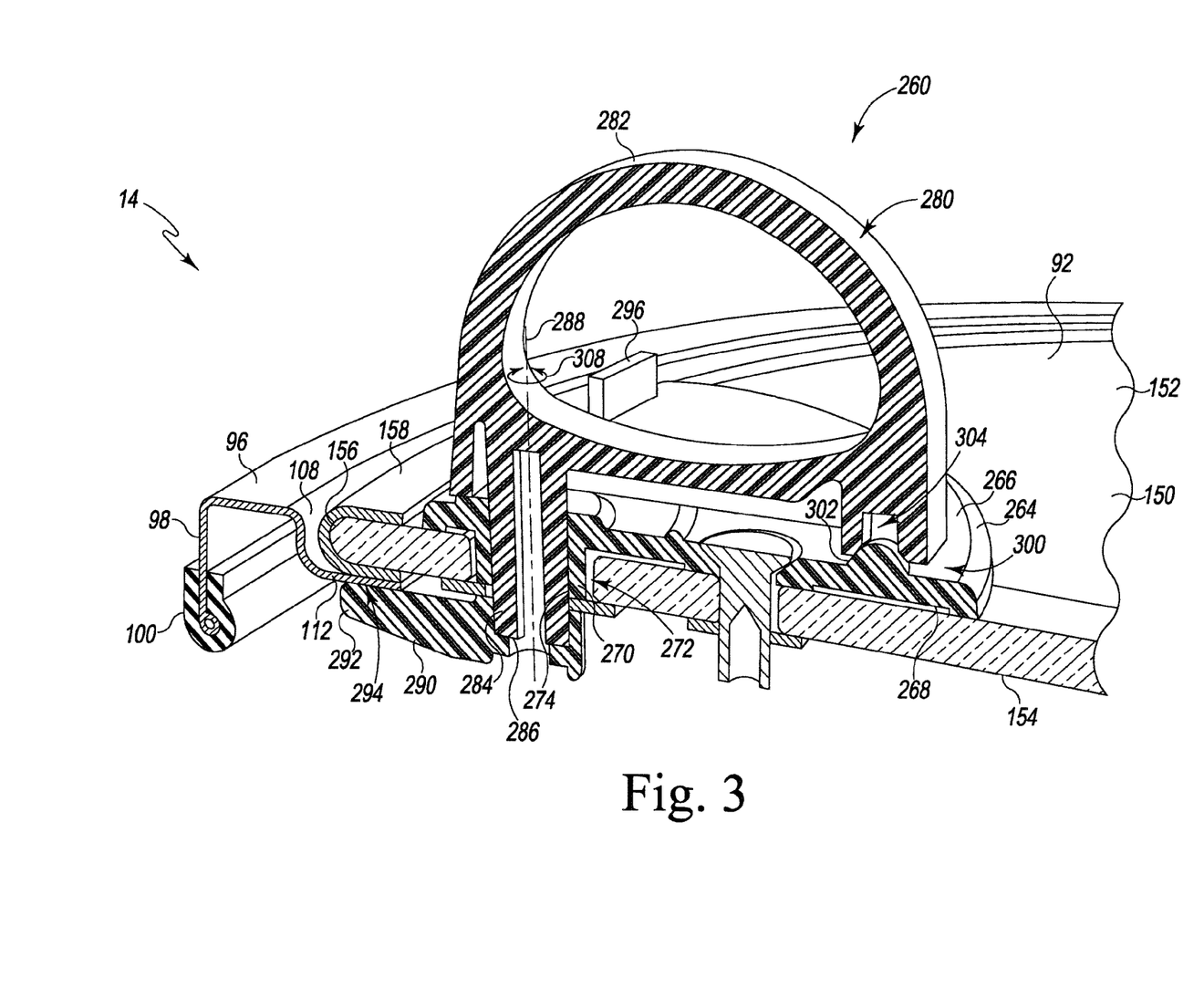
FIG. 3 is a partial cross-sectional perspective view of the removable lid of FIG. 1 taken along the line 3-3 in FIG. 1.

The removable lid 14 of the slow cooker 10 also includes locking mechanisms 260, 262 for the lid panels 92, 94, respectively, that are configured to prevent the lid panels 92, 94 from opening inadvertently. As shown in FIG. 3, the locking mechanism 260 for the lid panel 92 includes a platform 264 secured to the upper surface 152 of the plate 150. The platform 264 has an upper surface 266, a lower surface 268 positioned opposite the upper surface 266, and a plug 270 that extends downwardly from the lower surface 268 through a slot 272 defined in the plate 150. A passageway 274 extends between an opening defined in the upper surface 266 of the platform 264 and an opening defined in the lower end of the plug 270.

The locking mechanism 260 also includes a knob 280 pivotally coupled to the platform 264. As shown in FIG. 3, the knob 280 includes a grip 282 positioned above the upper surface 266 of the platform 264 and a shaft 284 that extends downwardly from the grip 282. The shaft 284 extends through the passageway 274 of the platform 264 and has a lower end 286 positioned below the lower surface 154 of the plate 150. As described in greater detail below, the shaft 284 defines an axis of rotation 288 about which the knob 280 may pivot to lock and unlock the lid panel 92.

The locking mechanism 260 of the removable lid 14 includes an arm 290 that is secured to the lower end 286 of the shaft 284. The arm 290 has a tip 292 configured to engage the lower surface 294 of the flange 112 of the frame 90. When the tip 292 of the arm 290 engages the lower surface 294 of the flange 112, the flange 112 is positioned between the arm 290 and the plate 150. As shown in FIG. 3, the lid panel 92 is thereby prevented from pivoting to the open position.

The locking mechanism 260 further includes a pair of stops 296, 298 that extend upwardly from the upper surface 266 of the platform 264. The stops 296, 298 are located on each side of the knob 280 to prevent rotation of the knob 280 about the axis of rotation 288 beyond predetermined positions. As shown in FIG. 3, the locking mechanism 260 includes a retention device 300 configured to maintain the knob 280 in the locked position. In the illustrative embodiment, the retention device 300 includes a protrusion 302 extending from the upper surface 266 and a groove 304 defined in the bottom of the grip 282 of the knob 280. When the knob 280 is positioned as shown in FIG. 3, the protrusion 302 is positioned in the groove 304, thereby inhibiting rotation of the knob 280.

As shown in FIG. 1, the removable lid 14 of slow cooker 10 includes another locking mechanism 262 configured to prevent the lid panel 94 from opening inadvertently. The locking mechanism 262 of the lid panel 94 is configured substantially similar to the locking mechanism 260 of the lid panel 92 described above. Like the locking mechanism 260, the locking mechanism 262 includes a platform 264, which is secured to the upper surface 172 of the plate 170, and a knob 280 that is pivotally coupled to the platform 264. As shown in FIG. 4, the locking mechanism 262 also includes an arm 290 that is secured to a lower end 286 of a shaft 284 of the knob 280. The arm 290 of the locking mechanism 262 has a tip 292 configured to engage the lower surface 306 of the flange 124 of the frame 90. When the tip 292 of the arm 290 engages the lower surface 306 of the flange 122, the flange 122 is positioned between the arm 290 and the plate 170 of the lid panel 94, thereby preventing the lid panel 94 from pivoting to the open position.

In other embodiments, the locking mechanisms for the lid panels 92, 94 may include springs, magnets, latches, or other structures to lock the lid panels 92, 94 in the closed position. For example, the lid panel 92 may include a magnetic portion configured to engage the metallic frame 90 to maintain the lid panel 92 in the closed position. Additionally, the knobs 280 of the lid panels 92, 94 may be fixed. It should also be appreciated that in other embodiments one or both of the locking mechanisms may be omitted.

In use, the removable lid 14 is positioned on the cooker assembly 12, as shown in FIG. 4. The gasket 100 of the removable lid 14 engages the rim 80 of the cooking vessel 18 to seal the cooking chamber 20, thereby preventing moisture from exiting the slow cooker 10. To access the cooking chamber 20 while the removable lid 14 is positioned on the cooking vessel 18, a user may open one or both of the lid panels 92, 94. For example, to open the lid panel 94, the user grasps the grip 282 of the knob 280 of the lid panel 94 and rotates the knob 280 about the axis of rotation 288 in either direction indicated by arrows 308.

As the knob 280 is rotated, the protrusion 302 is moved out of the groove 304 defined in the grip 282, and the tip 292 of the arm 290 is moved out of engagement with the frame 90. When the tip 292 is disengaged from the frame 90, the user may begin pivoting the lid panel 94 about the axis 248 from the closed position shown in FIG. 1 to the open position shown in FIG. 4. The user may also release the knob 280 after disengaging the tip 292, and the spring 226 will urge the lid panel 94 upward until the plate 170 of the lid panel 94 is advanced into contact with the handle 132. With the lid panel 94 open, the user may access the cooking chamber 20 with, for example, a utensil 310, without removing the removable lid 14. In that way, a user may hold a dish in one hand and operate the utensil 310 with the other.

The lid panel 94 may be closed by pushing downward on the upper surface 174 of the plate 170 and overcoming the bias exerted by the spring 226. The lid panel 94 may then be pivoted downward to the closed position. When the lid panel 94 is located in the closed position, the knob 280 may be rotated about the axis of rotation 288 to advance the tip 292 of the arm 290 into engagement with the frame 90, thereby locking the lid panel 94 in the closed position.

Referring now to FIGS. 5-8, other embodiments of a removable lid are illustrated. Some features of the embodiments illustrated in FIGS. 5-8 are substantially similar to those discussed above in reference to the embodiments of FIGS. 1-4. Such features are designated in FIGS. 5-8 with the same reference numbers as those used in FIGS. 1-4.

Figure 5:
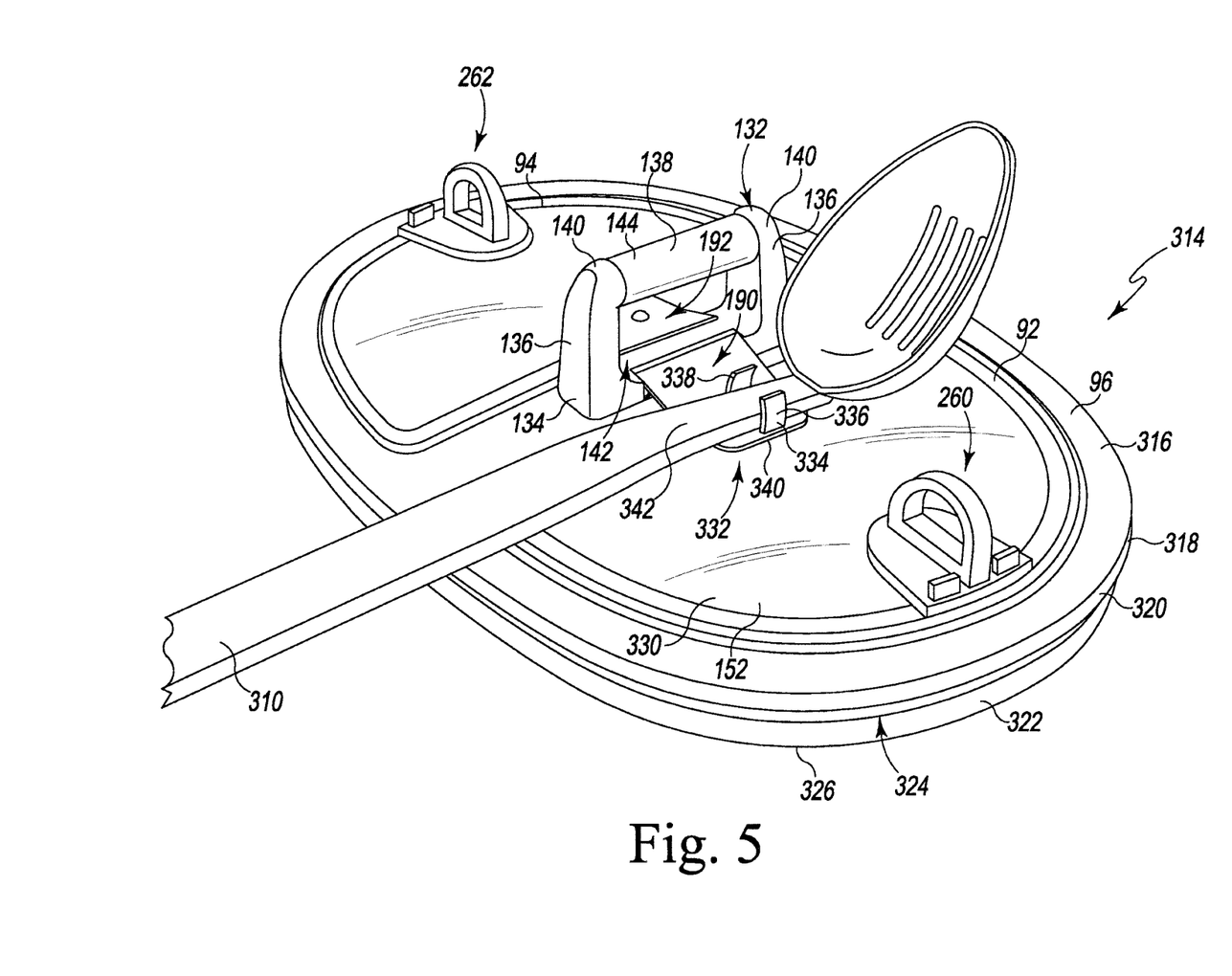
FIG. 5 is a perspective view of another embodiment of a removable lid.
Figure 6:
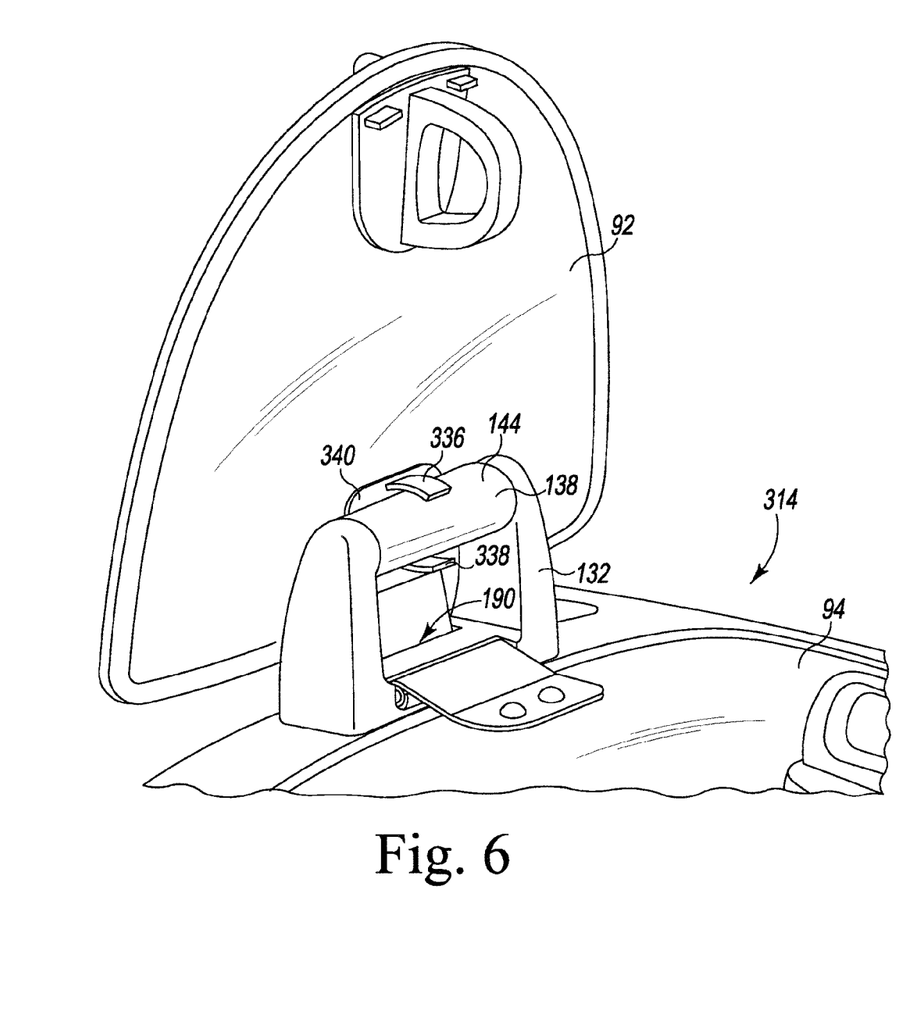
FIG. 6 is another perspective view of the removable lid of FIG. 5 showing one lid panel open.

Referring now to FIGS. 5 and 6, a removable lid 314 is shown. The removable lid 314 includes a frame 316 and a pair of lid panels 92, 94 pivotally coupled to the frame 316. The frame 316 includes an upper wall 96 and an outer perimeter wall 318 extending downwardly from the upper wall 96. The outer perimeter wall 318 includes an upper wall section 320 and a lower wall section 322 offset or otherwise spaced inwardly from the upper wall section 320. The wall sections 320, 322 cooperate to define a rim 324 therebetween. When the removable lid 314 is positioned on the cooking vessel 18, a lower edge 326 of the lower wall section 322 engages the rim 80 of the cooking vessel 18 while the rim 324 of the removable lid 314 engages the upper surface 72 of the cooking vessel 18. It should be appreciated that in other embodiment the removable lid 314 may include a gasket that engages the rim 80 or the upper surface 72 of the cooking vessel 18.

As shown in FIGS. 5 and 6, the removable lid 14 includes a handle 132 that is positioned between a pair of openings 104, 106 defined in the frame 316. The handle 132 has a support base 134 that is secured to the upper wall 96 of the frame 90 and a pair of arms 136 that extend upwardly from the support base 134. A grip 138 extends between the upper ends 140 of the arms 136 such that a substantially rectangular slot 142 is defined in the handle 132. As shown in FIG. 1, the grip 138 has a substantially-smooth cylindrical outer surface 144.

The lid panels 92, 94 are pivotally coupled to the support base 134 of the handle 132 via a pair of hinge assemblies 190, 192. The hinge assemblies 190, 192 permit the lid panels 92, 94 to be moved between the closed position shown in FIG. 5 and an open position. Like the removable lid 14 described above in regard to FIGS. 1-4, the removable lid 314 includes locking mechanisms 260, 262 for the lid panels 92, 94, respectively, that are configured to prevent the lid panels 92, 94 from opening inadvertently.

As shown in FIG. 5, the lid panel 92 includes a plate 330 shaped and sized to be received in a recess 110 defined in the frame 316. The plate 330 of the lid panel 92 includes a convex upper surface 152. The removable lid 314 also includes a retention mechanism 332 that maintains the lid panel 92 in an open position. The retention mechanism 332 includes a clip 334 secured to the upper surface 152 of the plate 330. The clip 334 includes a pair of spring arms 336, 338 that extend upwardly from a platform 340 secured to the plate 330. As shown in FIG. 6, the spring arms 336, 338 are configured to engage the outer surface 144 of the grip 138 when the lid panel 92 is in the open position, thereby retaining the lid panel 92 in that position. When the lid panel 92 is in the closed position, the spring arms 336, 338 are configured to receive a handle 342 of the utensil 310, as shown in FIG. 5.

It should be appreciated that in other embodiments the removable lid may include another retention mechanism to maintain the lid panel 94 in an open position. In other embodiments, the retention mechanism may include one or both may include springs, latches, magnets, and other structures that are configured to maintain the lid in an open position. For example, in one embodiment, the lid panel 92 or the lid panel 94 may include a magnetic portion configured to engage the metallic outer surface of the grip. In other embodiments, the lid panel 92 or the lid panel 94 may include a prong configured to be received in a slot defined in the handle.

Figure 7:
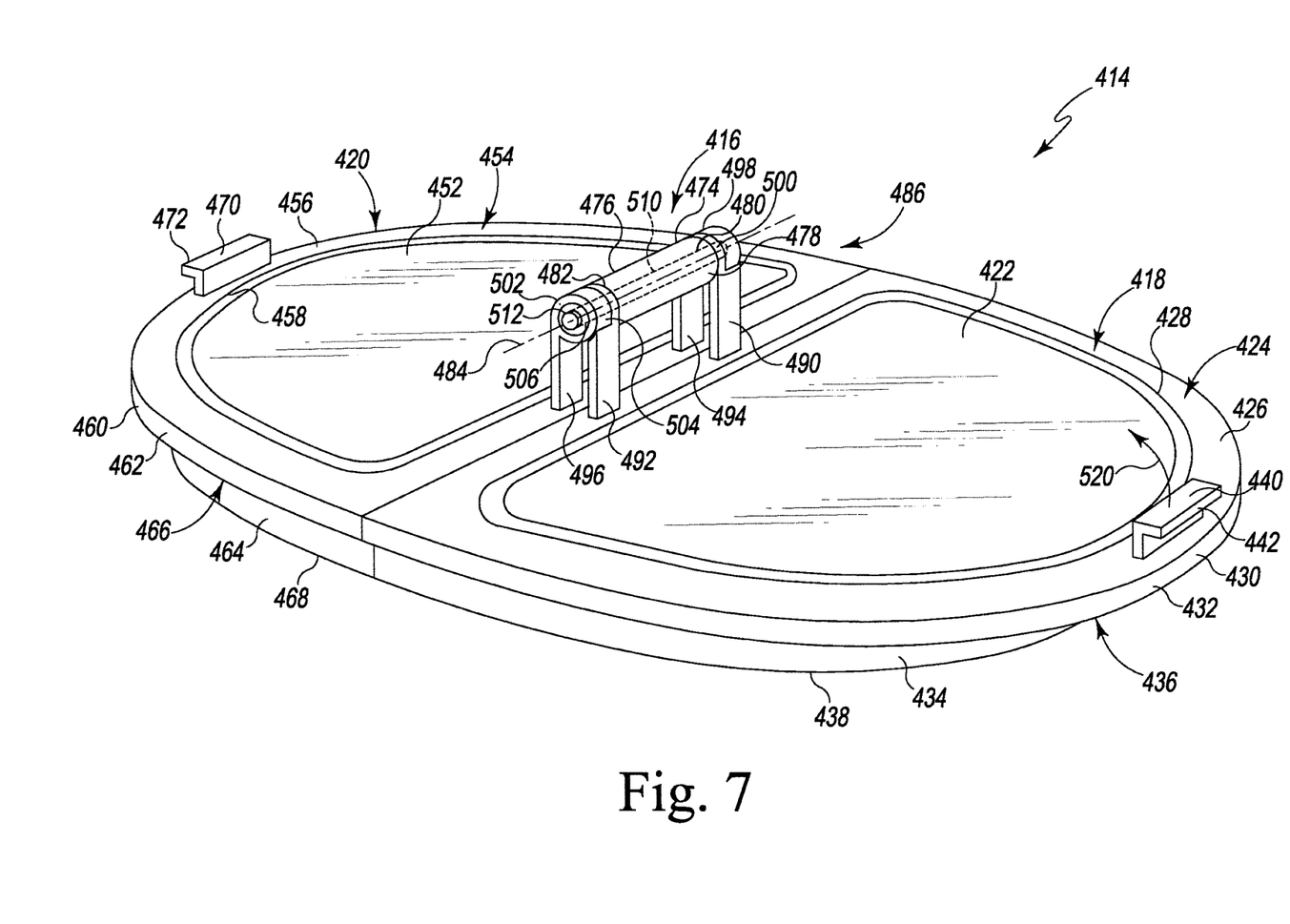
FIG. 7 is a perspective view of another embodiment of a removable lid.
Figure 8:
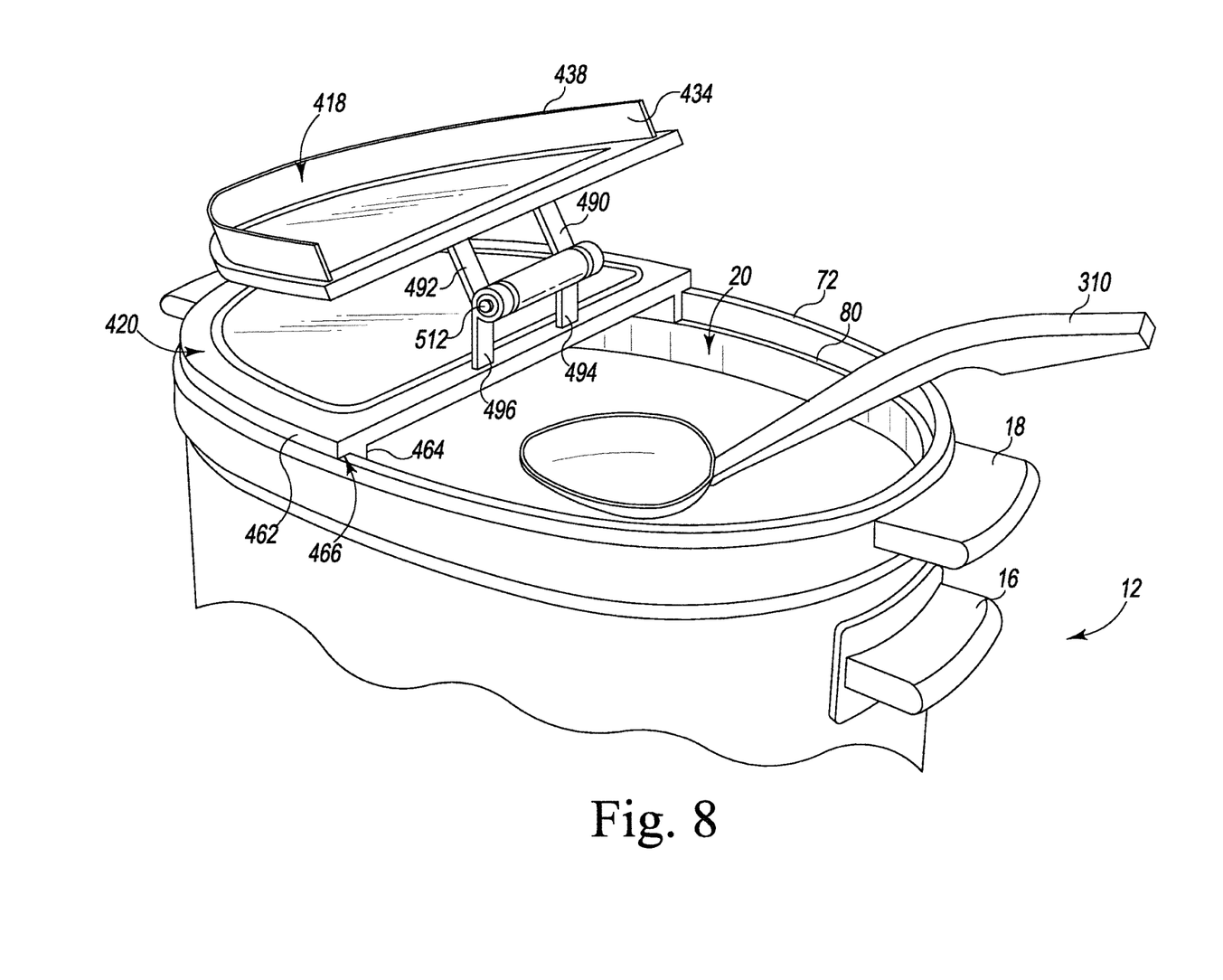
FIG. 8 is another perspective view of the removable lid of FIG. 7 showing one lid panel open.

Referring now to FIGS. 7 and 8, another embodiment of a removable lid (hereinafter removable lid 414) is shown. The removable lid 414 includes a handle 416 and a pair of lid panels 418, 420 pivotally coupled to the handle 416. As shown in FIG. 7, the lid panel 418 includes a plate 422 enclosed by an outer shell 424. In the illustrative embodiment, the plate 422 is substantially planar or flat and is formed from substantially transparent glass. It should be appreciated that in other embodiments the glass may be tinted or opaque, and, in other embodiments, one or both of the plate 422 may be formed from a metallic material such as aluminum or steel.

The outer shell 424 of the lid panel 418 includes an upper wall 426 secured to an outer edge 428 of the plate 422. An outer wall 430 extends downwardly from the upper wall 426 of the lid panel 418. The outer wall 430 includes an upper wall section 432 and a lower wall section 434 offset or otherwise spaced inwardly from the upper wall section 432. The wall sections 432, 434 cooperate to define a rim 436 therebetween. When the removable lid 414 is positioned on the cooking vessel 18, a lower edge 438 of the lower wall section 434 engages the rim 80 of the cooking vessel 18 while the rim 436 of the lid panel 418 engages the upper surface 72 of the cooking vessel 18. It should be appreciated that in other embodiment the removable lid 414 may include a gasket that engages the rim 80 or the upper surface 72 of the cooking vessel 18.

The outer shell 424 of the lid panel 418 also includes a knob 440 extending upwardly from the upper wall 426. The knob 440 includes a grip 442 that a user may grasp to pivot the lid panel 418 from the closed position shown in FIG. 7 to the open position shown in FIG. 8, as described in greater detail below. It should be appreciated that in other embodiments the outer shell 424 may include a slot that is defined in the lower wall section 434, which is sized to receive the handle 342 of the utensil 310.

As described above, the removable lid 414 also includes a lid panel 420 that is pivotally coupled to the handle 416. As shown in FIG. 7, the lid panel 420 includes a plate 452 enclosed by an outer shell 454. In the illustrative embodiment, the plate 452 is substantially planar or flat and is formed from substantially transparent glass. It should be appreciated that in other embodiments the glass may be tinted or opaque, and, in other embodiments, one or both of the plate 452 may be formed from a metallic material such as aluminum or steel.

The outer shell 454 of the lid panel 420 contacts the outer shell 424 of the lid panel 418 when the panels 418, 420 are closed. The outer shell 454 includes an upper wall 456 secured to an outer edge 458 of the plate 452. An outer wall 460 extends downwardly from the upper wall 456 of the lid panel 420. The outer wall 460 includes an upper wall section 462 and a lower wall section 464 offset or otherwise spaced inwardly from the upper wall section 462. The wall sections 462, 464 cooperate to define a rim 466 therebetween. When the removable lid 414 is positioned on the cooking vessel 18, a lower edge 468 of the lower wall section 464 of the lid panel 420 engages the rim 80 of the cooking vessel 18 while the rim 466 of the lid panel 420 engages the upper surface 72 of the cooking vessel 18. It should be appreciated that in other embodiment the removable lid 414 may include a gasket that engages the rim 80 or the upper surface 72 of the cooking vessel 18.

The outer shell 454 of the lid panel 420 also includes a knob 470 extending upwardly from the upper wall 456. The knob 470 includes a grip 472 that a user may grasp to pivot the lid panel 420 from the closed position shown in FIG. 7 to an open position.

As shown in FIG. 7, the handle 416 of the removable lid 414 includes a grip 474 positioned above the lid panels 418, 420. The grip 474 has a body 476 that includes a cylindrical outer surface 478 that extends from an end 480 to an end 482. In the illustrative embodiment, the body 476 has a longitudinal axis 484 extending through the ends 480, 482. As described in greater detail below, the lid panels 418, 420 are configured to pivot the axis 484 of the handle 416.

The lid panels 418, 420 are pivotally coupled to the handle 416 via hinge assembly 486. The hinge assembly 486 includes a pair of arms 490, 492 that extend upwardly from the upper wall 426 of the outer shell 424 of the lid panel 418. The hinge assembly 486 also includes a pair of arms 494, 496 that extend upwardly from the upper wall 456 of the outer shell 454 of the lid panel 420. As shown in FIG. 7, the upper end 498 of the arm 494 of the lid panel 420 is positioned adjacent to the end 480 of the grip 474, and the upper end 500 of the arm 490 of the lid panel 418 is positioned between the end 498 of the arm 494 and the end 480 of the grip 474. The upper end 502 of the arm 496 is positioned adjacent to the opposite end 482 of the grip 474, and the upper end 504 of the arm 492 of the lid panel 418 is positioned between the end 502 of the arm 496 and the end 482 of the grip 474.

The upper ends 498, 500, 502, 504 of the arms 490, 492, 494, 496 have a plurality of bores 506 defined therein that are aligned with the longitudinal axis 484 of the handle 416. The body 476 of the grip 474 has a cylindrical passageway 510 that extends through the ends 480, 482 and is aligned with the longitudinal axis 484. As shown in FIGS. 7 and 8, the hinge assembly 486 includes a cylindrical pin 512 that is positioned in the bores 506 and the passageway 510 that couples the arms 490, 492, 494, 496 to the handle 416.

In use, the removable lid 414 is positioned on the cooker assembly 12. The lower edges 438, 468 of the lid panels 418, 420, respectively, engage the rim 80 of the cooking vessel 18 to seal the cooking chamber 20, thereby preventing moisture from exiting the slow cooker 10. To access the cooking chamber 20 while the removable lid 414 is positioned on the cooking vessel 18, a user may open one or both of the lid panels 418, 420. For example, to open the lid panel 418, the user may grasp the grip 442 of the knob 440 and lift in the direction indicated by arrow 520 in FIG. 7 to pivot the lid panel 418 about the axis 484 and move the lid panel 418 to the open position shown in FIG. 8. The lid panel 420 may be similarly pivoted about the axis 484 to move between the closed position and an open position.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure.

The invention claimed is:

1. A slow cooker comprising:
a base having a heating element coupled thereto,
a cooking vessel removably positioned in a compartment defined in the base, the cooking vessel having a cooking chamber defined therein, and
a removable lid coupled to the cooking vessel, the removable lid comprising:
a first panel that is moveable between (i) an open position in which access to the cooking chamber is permitted and (ii) a closed position in which access to the cooking chamber is prevented, wherein the first panel has an upper surface and a lower surface,
a second panel that is moveable between (i) an open position in which access to the cooking chamber is permitted and (ii) a closed position in which access to the cooking chamber is prevented,
a frame, wherein the first panel and the second panel are pivotally coupled to the frame, and
a locking mechanism configured to lock the first panel in the closed position, wherein the locking mechanism includes (i) a handle pivotally coupled to the first panel, the handle having a grip positioned above the upper surface of the first panel, and (ii) an arm secured to an end of the handle below the lower surface of the first panel, the arm being movable between a locked position in which a tip of the arm is engaged with the frame, and an unlocked position in which the tip of the arm is disengaged from the frame.

2. The slow cooker of claim 1, wherein:
the frame includes (i) an outer rim engaged with the cooking vessel, the outer rim defining an outer perimeter of the frame, (ii) a first inner flange, the first inner flange defining a first opening in the frame, and (iii) a second inner flange, the second inner flange defining a second opening in the frame,
the first panel is positioned within the outer perimeter of the frame, the first panel being configured to engage the first inner flange and enclose the first opening when the first panel is in the closed position, and
the second panel is positioned within the outer perimeter of the frame, the first panel being configured to engage the second inner flange and enclose the second opening when the second panel is in the closed position.

3. The slow cooker of claim 2, wherein the first panel includes an outer gasket configured to engage the first inner flange, and the second panel includes an outer gasket configured to engage the second inner flange.

4. The slow cooker of claim 2, wherein the frame includes a handle positioned between the first opening and the second opening.

5. The slow cooker of claim 4, wherein the handle includes a support base and a grip positioned above the support base, and the first panel and the second panel are pivotally coupled to the support base of the handle.

6. The slow cooker of claim 5, wherein the removable lid includes a retention mechanism configured to maintain the first panel in the open position.

7. The slow cooker of claim 6, wherein the retention mechanism includes a clip secured to the first panel, the clip being configured to engage the grip of the handle when the first panel is in the open position.

8. The slow cooker of claim 7, further comprising a cooking utensil having a handle arm, wherein the clip is sized to receive the handle arm when the first panel is in the closed position.

9. The slow cooker of claim 1, wherein the removable lid includes a biasing element configured to bias the first panel in the open position.

10. A slow cooker comprising:
a base having a heating element coupled thereto,
a cooking vessel removably positioned in a compartment defined in the base, the cooking vessel having a cooking chamber defined therein, and
a removable lid coupled to the cooking vessel, the removable lid comprising:
a handle,
a first panel pivotally coupled to the handle and moveable between (i) an open position in which access to the cooking chamber is permitted and (ii) a closed position in which access to the cooking chamber is prevented,
a second panel pivotally coupled to the handle and moveable between (i) an open position in which access to the cooking chamber is permitted and (ii) a closed position in which access to the cooking chamber is prevented, and
a retention mechanism configured to maintain the first panel in the open position, wherein the retention mechanism includes a clip secured to the first panel, the clip being configured to directly contact the handle when the first panel is in the open position.

11. The slow cooker of claim 10, wherein the removable lid further comprises an outer shell, and the handle is pivotally coupled to the outer shell.

12. The slow cooker of claim 10, further comprising a serving utensil having a handle arm, wherein the clip is sized to receive the handle arm when the first panel is in the closed position.

13. A slow cooker comprising:
a base having a heating element coupled thereto,
a cooking vessel removably positioned in a compartment defined in the base, the cooking vessel having a cooking chamber defined therein, wherein the cooking vessel includes a rim that defines the cooking chamber, and
a removable lid coupled to the cooking vessel, the removable lid comprising:
a handle,
a first panel pivotally coupled to the handle and moveable between (i) an open position in which access to the cooking chamber is permitted and (ii) a closed position in which access to the cooking chamber is prevented, wherein the first panel includes a glass plate and an outer shell secured to the glass plate, the outer shell being configured to engage the rim of the cooking vessel,
a second panel pivotally coupled to the handle and moveable between (i) an open position in which access to the cooking chamber is permitted and (ii) a closed position in which access to the cooking chamber is prevented, and
a support arm having a first end secured to the outer shell of the first panel and a second end pivotally coupled to a grip of the handle.

* * * * *